United States Patent
Chen et al.

(10) Patent No.: US 9,380,640 B2
(45) Date of Patent: Jun. 28, 2016

(54) COMMUNICATION APPARATUS EQUIPPED WITH SWITCHABLE ANTENNA

(71) Applicant: Cho-Yi Lin, New Taipei (TW)

(72) Inventors: Shih-Chieh Chen, New Taipei (TW); Shih-Wei Hsieh, Taipei (TW); Cho-Yi Lin, New Taipei (TW)

(73) Assignee: Shenzhen China Star Optoelectronics Technology Co., Ltd., Guangming District of Shenzhen, Shenzhen, Guangdong (CN)

( * ) Notice: Subject to any disclaimer, the term of this patent is extended or adjusted under 35 U.S.C. 154(b) by 0 days.

(21) Appl. No.: 13/680,101

(22) Filed: Nov. 18, 2012

(65) Prior Publication Data

US 2014/0063345 A1   Mar. 6, 2014

(30) Foreign Application Priority Data

Sep. 4, 2012  (TW) .............................. 101132204 A

(51) Int. Cl.
*H04B 1/44* (2006.01)
*H04B 1/46* (2006.01)
(Continued)

(52) U.S. Cl.
CPC ................. *H04W 88/02* (2013.01); *H01Q 5/50* (2015.01); *H04B 1/006* (2013.01); *H04B 1/18* (2013.01); *H04N 7/142* (2013.01); *H04N 21/42638* (2013.01); *H04B 7/0805* (2013.01)

(58) Field of Classification Search
CPC ...... H04B 1/005; H04B 1/0053; H04B 1/006; H04B 1/0067; H04B 1/0458
USPC ................. 455/78–83, 552.1–553.1, 103, 132
See application file for complete search history.

(56) References Cited

U.S. PATENT DOCUMENTS 7,729,674 B2 * 6/2010 Shie et al. ...................... 455/201
8,396,044 B2 * 3/2013 Rofougaran .................. 370/338
(Continued)

FOREIGN PATENT DOCUMENTS

CN  101996448 A  8/2009
CN  101589555 A  11/2009
(Continued)

OTHER PUBLICATIONS

First Office Action; Chinese Patent Application 201210380187.3; dated Mar. 13, 2015; State Intellectual Property Office of the People's Republic of China.

*Primary Examiner* — Simon Nguyen
(74) *Attorney, Agent, or Firm* — Winston Hsu; Scott Margo

(57) ABSTRACT

A communication apparatus equipped with switchable antenna mechanism is provided, where the communication apparatus includes at least a portion of a portable electronic device, which includes a plurality of wireless communication functions respectively corresponding to different communication standards, and the wireless communication functions include a mobile phone function and at least one other wireless communication function. The communication apparatus includes: an antenna; a processing circuit; a plurality of processing modules arranged to provide the portable electronic device with a plurality of functions, respectively, where the functions include at least a portion of the wireless communication functions; and a switching unit. It is an advantage that, by utilizing the switching unit, different portions of the communication apparatus can share the antenna to achieve the best beneficial result through the limited area of a printed circuit board (PCB).

10 Claims, 4 Drawing Sheets

(51) Int. Cl.

| | | |
|---|---|---|
| *H04M 1/00* | (2006.01) | |
| *H04W 88/02* | (2009.01) | |
| *H04N 7/14* | (2006.01) | |
| *H04B 1/00* | (2006.01) | |
| *H04N 21/426* | (2011.01) | |
| *H04B 1/18* | (2006.01) | |
| *H01Q 5/50* | (2015.01) | |
| *H04B 7/08* | (2006.01) | |

(56) References Cited

U.S. PATENT DOCUMENTS

| | | | |
|---|---|---|---|
| 8,478,334 B2* | 7/2013 | Iwai et al. | 455/550.1 |
| 8,660,603 B2* | 2/2014 | Block et al. | 455/552.1 |
| 8,744,373 B2* | 6/2014 | Pourseyed | 455/101 |
| 8,768,267 B2* | 7/2014 | Lee et al. | 455/73 |
| 2002/0090974 A1* | 7/2002 | Hagn | 455/552 |
| 2005/0136847 A1* | 6/2005 | Matsui et al. | 455/78 |
| 2006/0030278 A1 | 2/2006 | Konaka | |
| 2008/0080451 A1* | 4/2008 | Rofougaran | 370/342 |
| 2008/0197923 A1* | 8/2008 | Nakajima et al. | 330/124 R |
| 2009/0003286 A1* | 1/2009 | Korden et al. | 370/335 |
| 2009/0130999 A1* | 5/2009 | Chen et al. | 455/129 |
| 2009/0153417 A1 | 6/2009 | Chen | |
| 2010/0120466 A1* | 5/2010 | Li | 455/552.1 |
| 2010/0124920 A1* | 5/2010 | Feher | 455/426.1 |
| 2011/0096705 A1* | 4/2011 | Kemmochi et al. | 370/297 |
| 2011/0181342 A1* | 7/2011 | Uejima et al. | 327/416 |
| 2011/0260806 A1* | 10/2011 | Takeuchi | 333/103 |
| 2012/0064952 A1* | 3/2012 | Iijima et al. | 455/571 |
| 2012/0142267 A1* | 6/2012 | Bae | 455/3.01 |
| 2012/0282981 A1* | 11/2012 | Mankaruse et al. | 455/572 |
| 2013/0102360 A1* | 4/2013 | Rofougaran et al. | 455/556.1 |
| 2013/0149975 A1* | 6/2013 | Yu et al. | 455/78 |
| 2013/0169493 A1* | 7/2013 | du Toit et al. | 343/745 |
| 2013/0321095 A1* | 12/2013 | Lam et al. | 333/103 |

FOREIGN PATENT DOCUMENTS

| | | |
|---|---|---|
| CN | 101997565 A | 3/2011 |
| CN | 102201819 A | 9/2011 |

* cited by examiner

COMMUNICATION APPARATUS EQUIPPED WITH SWITCHABLE ANTENNA

BACKGROUND OF THE INVENTION

1. Field of the Invention

The present invention relates to antenna control of a portable electronic device, and more particularly, to a communication apparatus equipped with a switchable antenna.

2. Description of the Prior Art

As the electronic circuit technology continues to develop in recent years, various wireless communication functions are widely implemented in many applications. According to the related art, a conventional communication apparatus is usually equipped with antennas corresponding to various radio frequency (RF) signals, respectively. For instance, the equipped antennas may include a Global Positioning System (GPS) antenna, a Bluetooth/Wireless-Fidelity (BT/WiFi) antenna, a Frequency Modulation (FM) internal antenna, a main antenna of $2^{nd}$ Generation/$3^{rd}$ Generation/$4^{th}$ Generation communication standard (i.e., a 2G/3G/4G main antenna), an analog television/China Mobile Multimedia Broadcasting antenna (ATV/CMMB antenna), and an Auxiliary antenna (AUX antenna). It should be noted that setting these antennas may introduce some issues. For one example, these antennas would occupy space in conventional communication apparatuses. For another example, these antennas and/or the feed points of these antennas would occupy space on printed circuit boards (PCBs) in conventional communication apparatuses.

Therefore, there is a need for a novel architecture for saving space in a communication apparatus and saving the PCB area.

SUMMARY OF THE INVENTION

One of the objectives of this invention is to provide a communication apparatus equipped with a switchable antenna to solve the problems mentioned above.

Another objective of the present invention is to provide a communication apparatus equipped with a switchable antenna for saving space in a communication apparatus and saving the PCB area.

The preferred embodiment of the present invention provides a communication apparatus equipped with switchable antenna mechanism, where the communication apparatus includes at least one portion of a portable electronic device, which includes a plurality of wireless communication functions respectively corresponding to different communication standards, and the plurality of wireless communication functions includes a mobile phone function and at least one other wireless communication function. The communication apparatus includes an antenna, a processing circuit, a plurality of processing modules, and a switching unit. The antenna is arranged to perform at least one of operations of receiving wireless signal and transmitting wireless signal. The processing circuit is arranged to control the operation of the portable electronic device. The plurality of processing modules is arranged to provide the portable electronic device with a plurality of functions, respectively, where the plurality of functions includes at least one portion of the plurality of wireless communication functions. The switching unit has a first terminal and a plurality of second terminals, where the first terminal is electrically connected to the antenna, and the plurality of second terminals are electrically connected to the plurality of processing modules respectively. Wherein under the control of the processing circuit, the switching unit electrically connects the first terminal to a specific second terminal of the plurality of second terminals, allowing a specific processing module coupled to the specific second terminal to use the antenna for operation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
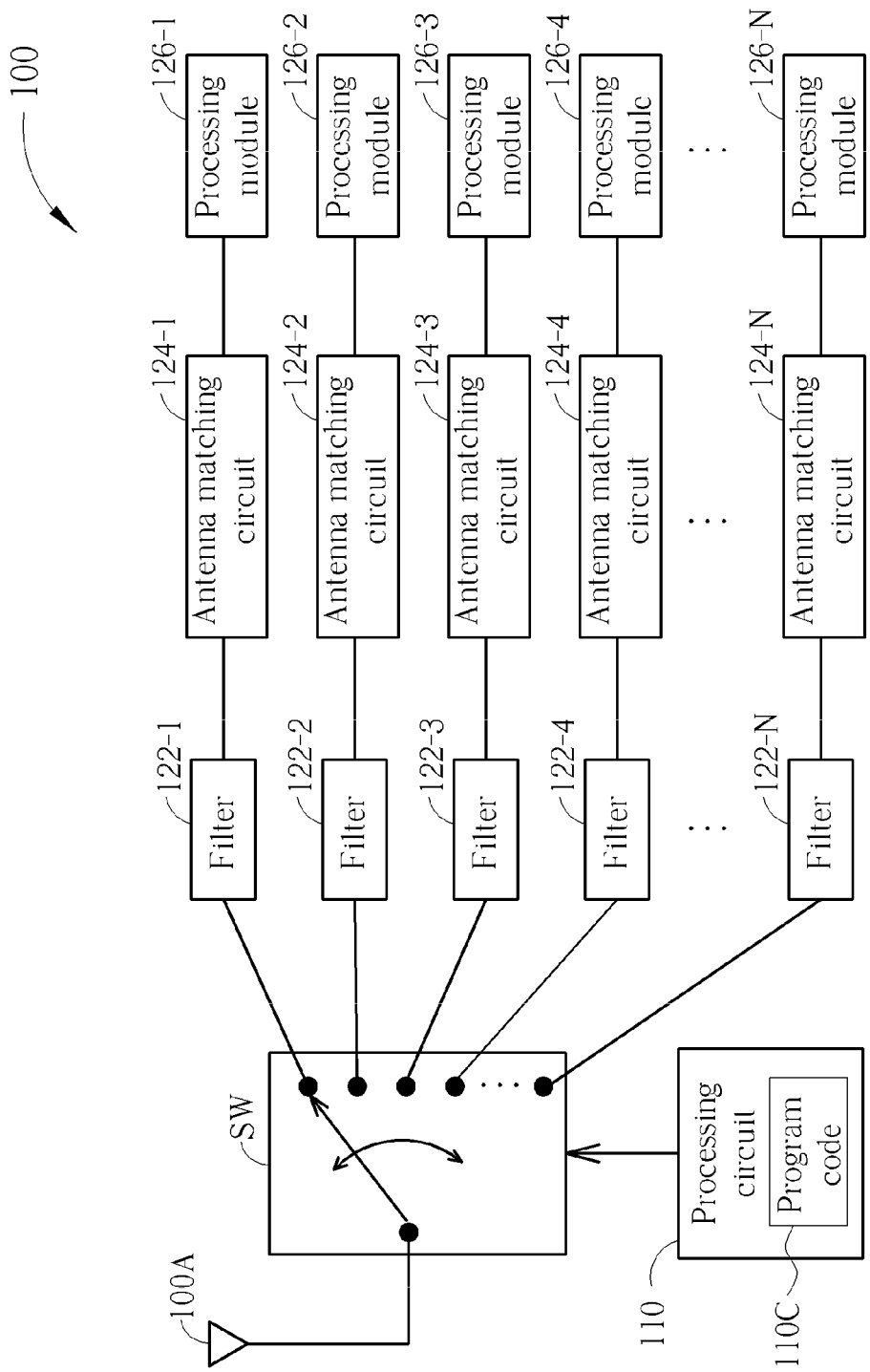
FIG. 1 is a diagram illustrating a communication apparatus equipped with a switchable antenna according to a first embodiment of the present invention.

FIG. 1 is a diagram illustrating a communication apparatus 100 equipped with a switchable antenna according to a first embodiment of the present invention. According to some embodiments, such as the first embodiment and alternative designs thereof, the communication apparatus 100 includes at least a portion of a portable electronic device (e.g., part of the portable electronic device, such as the PCB of the portable electronic device and components located on the PCB; or all of the portable electronic device, that is, the entire portable electronic device), wherein the portable electronic device has a plurality of wireless communication functions corresponding to different communication standards, respectively, and the wireless communication functions include a mobile phone function and at least one other wireless communication function. The at least one other wireless communication function mentioned above may include a Bluetooth (BT) wireless communication function, a wireless fidelity (WiFi) communication function, a Global Positioning System (GPS) wireless communication function, and/or a Worldwide Interoperability for Microwave Access (WiMAX) wireless communication function.

As shown in FIG. 1, the communication apparatus 100 includes an antenna 100A, a switching unit SW, a processing circuit 110, a plurality of filters 122-1, 122-2, 122-3, 122-4, ..., 122-N (symbol N represents a positive integer), a plurality of antenna matching circuits 124-1, 124-2, 124-3, 124-4, ..., 124-N, a plurality of processing modules 126-1, 126-2, 126-3, 126-4, ..., 126-N, wherein the switching unit SW has a first terminal and a plurality of second terminals, and the first terminal is electrically connected to the antenna 100A, and the second terminals are coupled to the processing modules 126-1, 126-2, 126-3, 126-4, ..., 126-N, respectively. More particularly, the second terminals are coupled to the processing modules 126-1, 126-2, 126-3, 126-4, ..., 126-N via the filters 122-1, 122-2, 122-3, 122-4, ..., 122-N and the antenna matching circuits 124-1, 124-2, 124-3, 124-4, ..., 124-N, respectively. Furthermore, the processing circuit 110 executes at least a program code such as a program code 110C. For instance, the processing circuit 110 may include a processor (not shown), wherein the processing circuit 110 which executes the program code 110C (more particularly, the processor which executes the program code 110C) may control the operation of the communication apparatus 100. However, this is for illustrative purpose only, and not meant to be a limitation of the present invention. According to some alternative designs of this embodiment, the processing circuit 110 may be implemented by pure hardware, and the program code 110C may be embedded in the processing circuit 110, wherein the processing circuit 110 which executes the program code 110C may control the operation of the communication apparatus 100.

According to this embodiment, the antenna 100A is used to perform at least one of wireless signal reception or wireless signal transmission (e.g., the operation of receiving wireless signals and/or the operation of transmitting wireless signals), and the processing circuit 110 which executes the program code 110C is used to control the operation of the portable electronic device. Moreover, the processing modules 126-1, 126-2, 126-3, 126-4, . . . , 126-N are used to provide the portable electronic device with a plurality of functions, respectively, wherein the functions may include at least a portion of the wireless communication functions. In addition, under the control of the processing circuit 110 which executes the program code 110C, the switching unit SW electrically connects the first terminal to a specific second terminal of the plurality of second terminals, thus allowing a specific processing module coupled to the specific second terminal to use the antenna 100A for performing a designated operation. For instance, the processing module 126-1 may be an RF control chipset for the $2^{nd}$ Generation/$3^{rd}$ Generation/$4^{th}$ Generation communication standards (i.e., a 2G/3G/4G RF chipset), and the processing module 126-2 may be an analog television chipset (i.e., an ATV chipset), the processing module 126-3 may be a digital television chipset (i.e., a DTV chipset), and the processing modules 126-4, . . . , 126-N may be various peripheral RF control chipsets (i.e., peripheral RF chipsets), including a BT chipset, a Wi-Fi chipset, a GPS chipset, and/or a WiMAX chipset.

In this embodiment, the filters 122-1, 122-2, 122-3, 122-4, . . . , 122-N are used to perform signal filtering for the processing modules 126-1, 126-2, 126-3, 126-4, . . . , 126-N. However, this is for illustrative purpose only, and not meant to be a limitation of the present invention. According to some alternative designs of this embodiment, at least a portion (i.e., part or all) of the filters 122-1, 122-2, 122-3, 122-4, . . . , 122-N may be omitted. In addition, in the embodiment shown in FIG. 1, the antenna matching circuits 124-1, 124-2, 124-3, 124-4, . . . , 124-N are used to perform antenna matching for the processing modules 126-1, 126-2, 126-3, 126-4, . . . , 126-N, wherein each antenna matching circuit is coupled between one of the processing modules 126-1, 126-2, 126-3, 126-4, . . . , 126-N and one of the second terminals. In practice, the antenna matching circuits 124-1, 124-2, 124-3, 124-4, . . . , 124-N may be implemented using resistor(s), capacitor(s) and/or inductor(s). For example, one of the antenna matching circuits 124-1, 124-2, 124-3, 124-4, . . . , 124-N may include at least a resistor, at least a capacitor, and/or at least an inductor. Particularly, the antenna matching circuits 124-1, 124-2, 124-3, 124-4, . . . , 124-N may be different from each other.

According to some alternative designs of this embodiment, the processing modules 126-1, 126-2, 126-3, 126-4, . . . , 126-N may include at least one wireless communication processing module, wherein the processing circuit 110 which executes the program code 110C may control the switching unit SW to switch dynamically, thus allowing the at least one wireless communication processing module and another processing module of the processing modules 126-1, 126-2, 126-3, 126-4, . . . , 126-N to operate simultaneously. In particular, the communication apparatus 100 of the alternative designs may further include at least one buffer used to performing buffering for the another processing module. For instance, the at least one wireless communication processing module may be the processing module 126-1, such as a 2G/3G/4G RF chipset mentioned above, and the another processing module may be a TV receiver, such as a DTV chipset mentioned above. For another example, the at least one wireless communication processing module may be the processing module 126-1, such as a 2G/3G/4G RF chipset mentioned above, and the another processing module may be a broadcasting receiver. However, these are for illustrative purpose only, and not meant to be limitations of the present invention. According to some alternative designs of this embodiment, in the case without the at least one buffer, the processing modules 126-1, 126-2, 126-3, 126-4, . . . , 126-N may include at least an analog TV receiver, at least a DTV receiver, and/or at least a broadcasting receiver. For example, the processing modules 126-1, 126-2, 126-3, 126-4, . . . , 126-N may include at least one of an ATV receiver and a DTV receiver. For another example, the processing modules 126-1, 126-2, 126-3, 126-4, . . . , 126-N may include at least a broadcasting receiver.

Figure 2:
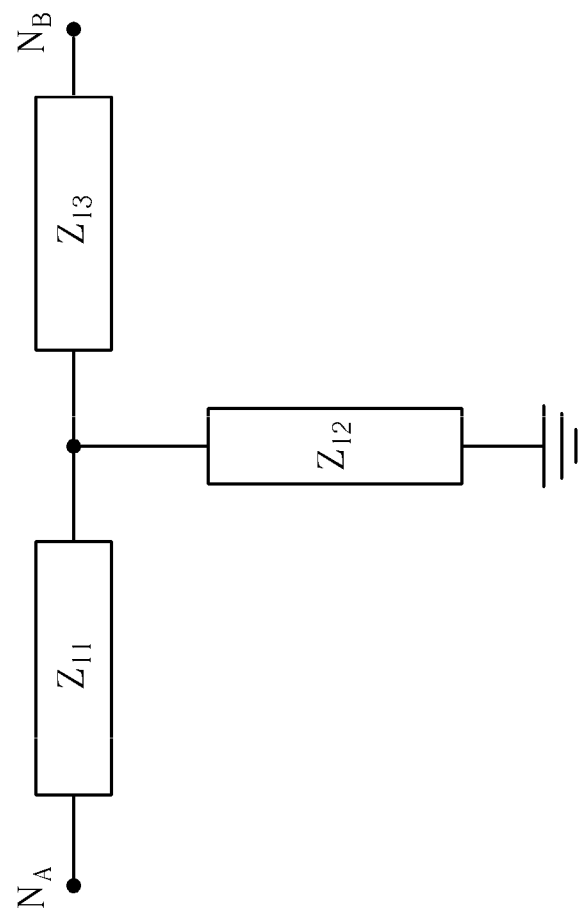
FIG. 2 is a diagram illustrating an antenna matching circuit related to the communication apparatus shown in FIG. 1 according to an embodiment of the present invention.

FIG. 2 is a diagram illustrating an antenna matching circuit related to the communication apparatus 100 shown in FIG. 1 according to an embodiment of the present invention. The antenna matching circuit shown in FIG. 2 may be utilized as an example of any one of the processing modules 126-1, 126-2, 126-3, 126-4, . . . , 126-N. As shown in FIG. 2, the antenna matching circuit may include a plurality of impedance components $Z_{11}$, $Z_{12}$ and $Z_{13}$, wherein any one of the impedance components $Z_{11}$, $Z_{12}$ and $Z_{13}$ may be a resistor, a capacitor, or an inductor. For instance, in a case where the antenna matching circuit in FIG. 2 represents the antenna matching circuit 124-$n$ (the index n may be a positive integer in a range [1, N]), node $N_A$ may be coupled to a corresponding second terminal of the second terminals via the filter 122-$n$, and node $N_B$ may be electrically connected to the corresponding processing module 126-$n$.

In this embodiment, the arrangement of the impedance components $Z_{11}$, $Z_{12}$ and $Z_{13}$ of the antenna matching circuit is similar to an English alphabet "T", and thus the antenna matching circuit may be referred to as a T-type matching network.

Figure 3:
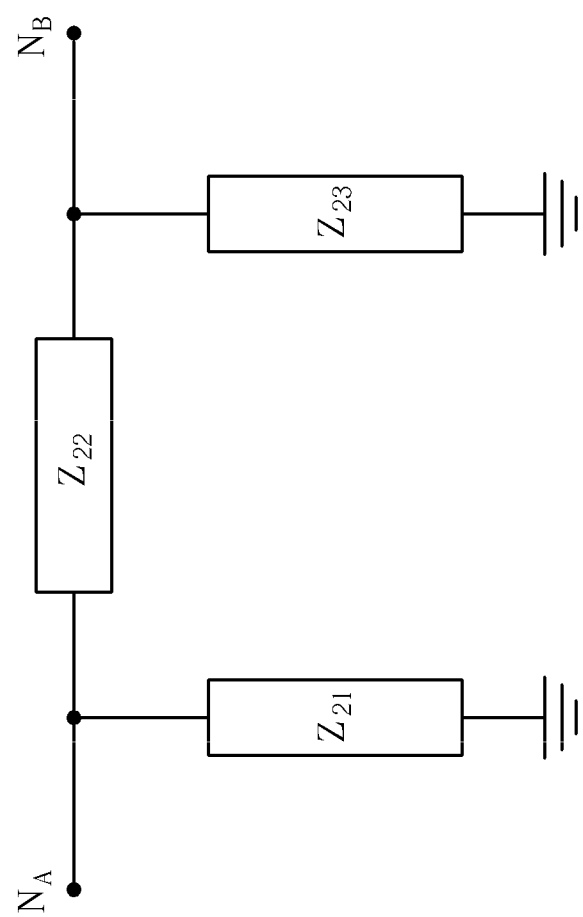
FIG. 3 is a diagram illustrating an antenna matching circuit related to the communication apparatus shown in FIG. 1 according to another embodiment of the present invention.

FIG. 3 is a diagram illustrating an antenna matching circuit related to the communication apparatus 100 shown in FIG. 1 according to another embodiment of the present invention. The antenna matching circuit shown in FIG. 3 may be utilized as an example of any one of the antenna matching circuits 124-1, 124-2, 124-3, 124-4, . . . , 124-N. As shown in FIG. 3, the antenna matching circuit may include a plurality of impedance components $Z_{21}$, $Z_{21}$ and $Z_{23}$, wherein any one of the impedance components $Z_{21}$, $Z_{21}$ and $Z_{23}$ may be a resistor, a capacitor, or an inductor. For instance, in a case where the antenna matching circuit in FIG. 3 represents the antenna matching circuit 124-$n$ (the index n may be a positive integer in a range [1, N]), the node $N_A$ may be coupled to a corresponding second terminal of the second terminals via the filter 122-$n$, and node NB may be electrically connected to the corresponding processing module 126-$n$.

In this embodiment, the arrangement of the impedance components $Z_{21}$, $Z_{21}$ and $Z_{23}$ of the antenna matching circuit is similar to a Greek alphabet "Π" (or "π"), and thus the antenna matching circuit in FIG. 3 may be referred to as a Π-type (or π-type) matching network.

Please note that, the architectures shown in FIG. 2 and FIG. 3 may be examples of at least one antenna matching circuit (e.g., one or more than one antenna matching circuit) of the communication apparatus 100. However, this is for illustrative purpose only, and not meant to be a limitation of the present invention. According to some alternative designs of this embodiment, the antenna matching circuit of the communication apparatus 100 is not limited to a T-type matching network or a Π-type (or π-type) matching network. For example, an antenna matching circuit of the communication apparatus 100 (or each of antenna matching circuits of the communication apparatus 100) may be a permutation/combination of at least one T-type matching network and at least one Π-type (or π-type) matching network. For another example, an antenna matching circuit of the communication apparatus 100 (or each of antenna matching circuits of the communication apparatus 100) may be a hybrid architecture of at least one T-type matching network and at least one Π-type (or π-type) matching network.

Figure 4:
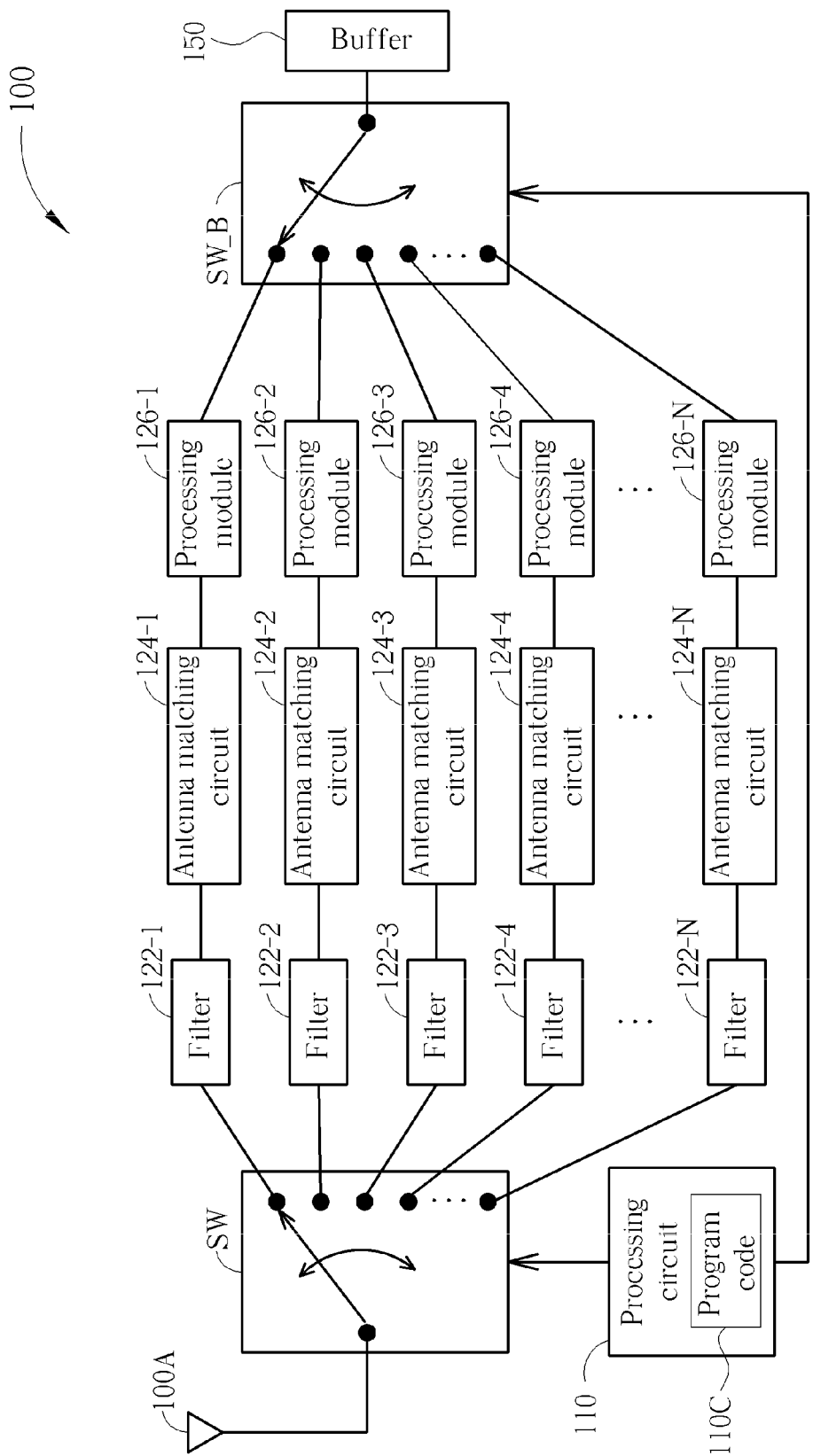
FIG. 4 is a diagram illustrating a buffer switching scheme related to the communication apparatus according to an embodiment of the present invention.

FIG. 4 is a diagram illustrating a buffer switching scheme related to the communication apparatus 100 according to an embodiment of the present invention. As shown in FIG. 4, the communication apparatus 100 may further include at least a buffer 150 and another switching unit SW_B.

According to this embodiment, the processing modules 126-1, 126-2, 126-3, 126-4, . . . , 126-N may include at least one wireless communication processing module such as a 2G/3G/4G RF chipset mentioned above, where the processing circuit 110 which executes the program code 110C may control the switching unit SW to switch dynamically, thus allowing the at least one wireless communication module mentioned above (e.g., a 2G/3G/4G RF chipset mentioned above) and at least one other processing module (e.g., a TV receiver mentioned above, such as a DTV chipset mentioned above; or a broadcasting receiver mentioned above) of the processing modules 126-1, 126-2, 126-3, 126-4, . . . , 126-N to operate simultaneously. In particular, the at least one buffer 150 mentioned above is used for buffering, and the another switching unit SW_B is used for sharing the at least one buffer with the at least one wireless communication processing module (e.g., a 2G/3G/4G RF chipset mentioned above) and at least a portion of the at least one other processing module (e.g., a TV receiver mentioned above, such as a DTV chipset mentioned above; or a broadcasting receiver mentioned above), such as the at least one wireless communication module mentioned above (e.g., a 2G/3G/4G RF chipset mentioned above) and all of the at least one other processing module (e.g., a TV receiver mentioned above, such as a DTV chipset mentioned above; or a broadcasting receiver mentioned above).

One of the advantages of the present invention is that, by utilizing the switching unit SW, different portions of the communication apparatus 100 can share the same antenna 100A to achieve the best beneficial result through the limited PCB area. Furthermore, due to that the processing circuit 110 which executes the program code 110C can control the switching unit SW to switch dynamically, the at least one wireless communication processing module and one or more than one other processing module (e.g., the aforementioned another processing module; or the aforementioned at least one other processing module) of the processing modules may operate simultaneously, wherein the at least one wireless communication processing module can monitor the corresponding communication system continuously, and more particularly, can monitor the corresponding communication system periodically. In this way, users can watch TV or listen to broadcasting without missing any incoming phone call.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication apparatus equipped with a switchable antenna mechanism, the communication apparatus comprising at least a portion of a portable electronic device, the portable electronic device including a plurality of wireless communication functions corresponding to different communication standards, respectively, the wireless communication functions comprising a mobile phone function and at least one other wireless communication function, the communication apparatus comprising:
 a processing circuit, arranged to control operations of the portable electronic device;
 a plurality of processing modules, arranged to provide the portable electronic device with a plurality of modulation functions, respectively, wherein at least a portion of the modulation functions conforms to wireless communication protocols;
 an antenna, arranged to receive and transmit wireless signals;
 a first switching unit, arranged between the antenna and the processing modules, and having a first terminal and a plurality of second terminals, wherein the first terminal of the first switching unit is electrically connected to the antenna, and the second terminals of the first switching unit are electrically connected to the processing modules, respectively;
 a plurality of antenna matching circuits coupled between the processing modules and the second terminals respectively, the antenna matching circuits arranged to perform antenna matching for the processing modules respectively, wherein each antenna matching circuit is coupled between one of the processing modules and one of the second terminals;
 a buffer, arranged to perform buffering; and
 a second switching unit, arranged between the processing modules and the buffer, and having a first terminal and a plurality of second terminals, wherein the first terminal of the second switching unit is electrically connected to the buffer, and the second terminals of the second switching unit are electrically connected to the processing modules, respectively;
 wherein the processing circuit is electrically connected to the first switching unit and the second switching unit, and further executes a program code to control the first switching unit and the second switching unit to switch dynamically, such that at least one processing module and another processing module of the plurality of processing modules operate simultaneously.

2. The communication apparatus of claim 1, wherein the antenna matching circuits comprise at least a resistor, at least a capacitor, and/or at least an inductor.

3. The communication apparatus of claim 1, wherein the antenna matching circuits are different from each other.

4. The communication apparatus of claim 1, wherein the another processing module is a television receiver.

5. The communication apparatus of claim 1, wherein the another processing module is a broadcasting receiver.

6. The communication apparatus of claim 1, wherein the processing modules comprise at least one of an analog television receiver and a digital television receiver.

7. The communication apparatus of claim 1, wherein the processing modules comprise at least a broadcasting receiver.

8. The communication apparatus of claim 1, wherein the wireless communication protocols further comprise a Bluetooth, a wireless fidelity and a Global Positioning System and/or a Worldwide Interoperability for Microwave Access.

9. The communication apparatus of claim 1, wherein at least one of the antenna matching circuits comprises: a first impedance component, a second impedance component and a third impedance component;

wherein the first impedance component and the third impedance component are electrically connected in series, and a terminal of the second impedance component is electrically connected to a node between the first impedance component and the third impedance component, and another terminal of the second impedance component is electrically connected to a ground, such that the first impedance component, the second impedance component and the first impedance component form a T-type matching network.

10. The communication apparatus of claim 1, wherein at least one of the antenna matching circuits comprises: a first impedance component, a second impedance component, a third impedance component;

wherein a terminal of the first impedance component is electrically connected to a terminal of the second impedance component, another terminal of the first impedance component is electrically connected to a ground; another terminal of the second impedance component is electrically connected to a terminal of the third impedance component, and another terminal of the third impedance component is electrically connected to the ground, such that the first impedance component, the second impedance component and the third impedance component form a Π-type matching network.

* * * * *